United States Patent
Wang et al.

(10) Patent No.: US 10,728,796 B2
(45) Date of Patent: Jul. 28, 2020

(54) METHOD FOR BLUETOOTH COMMUNICATION, BLUETOOTH SYSTEM AND ELECTRONIC DEVICE

(71) Applicant: SMARTECH WORLDWIDE LIMITED, Tortola (VG)

(72) Inventors: Mid Wang, Hong Kong (CN); Yunhe Fu, Hong Kong (CN); Tony Xie, Hong Kong (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/957,948

(22) Filed: Apr. 20, 2018

(65) Prior Publication Data
US 2018/0317126 A1 Nov. 1, 2018

(30) Foreign Application Priority Data
Apr. 27, 2017 (CN) .......................... 2017 1 0286764

(51) Int. Cl.
*H04W 28/04* (2009.01)
*H04W 4/80* (2018.01)
*H04W 84/18* (2009.01)
*H04W 56/00* (2009.01)
*G06F 3/16* (2006.01)
(Continued)

(52) U.S. Cl.
CPC ............. *H04W 28/04* (2013.01); *H04W 4/80* (2018.02); *G06F 3/165* (2013.01); *H04B 5/0031* (2013.01); *H04L 67/06* (2013.01); *H04W 56/0015* (2013.01); *H04W 84/18* (2013.01)

(58) Field of Classification Search
CPC . H04L 1/00; H04L 1/18; H04L 67/06; H04W 4/80; H04W 28/04; H04W 84/18; H04W 56/0015; G06F 3/165; H04B 5/0031
See application file for complete search history.

(56) References Cited

U.S. PATENT DOCUMENTS

| | | | |
|---|---|---|---|
| 2002/0028658 A1* | 3/2002 | Ami | H04H 60/92 455/41.2 |
| 2005/0148298 A1* | 7/2005 | Ma | H04W 24/00 455/41.2 |

(Continued)

FOREIGN PATENT DOCUMENTS

| CN | 103985234 A | 8/2014 |
|---|---|---|
| CN | 105812906 A | 7/2016 |

*Primary Examiner* — Asad M Nawaz
*Assistant Examiner* — Kai Chang

(57) ABSTRACT

A method for Bluetooth communication, a Bluetooth system and an electronic device are disclosed. The Bluetooth system includes: a data source device, a primary device and at least one secondary device. The primary device is configured to acquire, via Bluetooth communication, first data packets delivered by a data source device as a first data packet set and the secondary device is configured to acquire, via data interception, second data packets from the data source device as a second data packet set within at least a portion of a time period in the Bluetooth communication. The primary device communicates with the secondary device in a predetermined interaction node and sends the missing data packet from the first data packet set according to the details of acquisition of the data packets from the data interception.

8 Claims, 6 Drawing Sheets

(51) Int. Cl.
   *H04B 5/00*   (2006.01)
   *H04L 29/08*  (2006.01)

(56) References Cited

U.S. PATENT DOCUMENTS

| | | | |
|---|---|---|---|
| 2009/0017868 A1* | 1/2009 | Ueda | H04B 1/3877 |
| | | | 455/557 |
| 2009/0161602 A1* | 6/2009 | Matsumoto | H04W 72/1242 |
| | | | 370/328 |
| 2010/0070637 A1* | 3/2010 | Saito | H04M 1/6066 |
| | | | 709/228 |
| 2012/0058727 A1* | 3/2012 | Cook | H04R 5/02 |
| | | | 455/41.3 |
| 2014/0029701 A1* | 1/2014 | Newham | H04L 7/041 |
| | | | 375/340 |
| 2014/0348327 A1* | 11/2014 | Linde | H04H 20/88 |
| | | | 381/2 |
| 2015/0319557 A1* | 11/2015 | El-Hoiydi | H04R 25/556 |
| | | | 455/41.2 |
| 2016/0098244 A1* | 4/2016 | Hsieh | G06F 3/165 |
| | | | 700/94 |
| 2016/0316051 A1* | 10/2016 | Hsieh | H04M 1/7253 |
| 2018/0084456 A1* | 3/2018 | Gostev | H04R 1/1016 |
| 2018/0184389 A1* | 6/2018 | Gentili | H04W 56/0035 |
| 2018/0192396 A1* | 7/2018 | Fu | H04W 4/80 |
| 2018/0248811 A1* | 8/2018 | Di Nallo | H04B 7/061 |

\* cited by examiner

METHOD FOR BLUETOOTH COMMUNICATION, BLUETOOTH SYSTEM AND ELECTRONIC DEVICE

CROSS-REFERENCE TO RELATED APPLICATIONS

The present disclosure claims priority to Chinese Patent Application No. 201710286764.5, filed with the Chinese Patent Office on Apr. 27, 2017, titled "METHOD, APPARATUS AND SYSTEM FOR BLUETOOTH COMMUNICATION, ELECTRONIC DEVICE", the entire contents of which are incorporated herein by reference.

TECHNICAL FIELD

The present disclosure relates to the technical field of Bluetooth, and in particular, relates to a method for Bluetooth communication, a Bluetooth system and an electronic device.

BACKGROUND

Various types of wireless transmission devices, for example, smart phones, Bluetooth headphones, MP3 players and the like, have been extensively applied. Most wireless transmission devices support Bluetooth transmission of audios and other types of data. In the Bluetooth protocol (A2DP profile), one data output source (for example, a smart phone, an MP3 player or the like) may be only connected to one audio playback device, and transmit data via Bluetooth to an audio playback device for playback.

In some scenarios, the data output source needs to transmit data to two or more than two audio playback devices. For example, the stereo headphone requires that left and right-channel playback devices are both wirelessly connected to the data output source. In case of data reception, the playback device in one channel (for example, the left headphone) only acts as a primary headphone to receive the data transmitted by the data output source. Then the data is transmitted to the playback device in the other channel via Bluetooth or other non-Bluetooth transmission protocols.

SUMMARY

An embodiment of the present disclosure provides a method for Bluetooth communication, applied to a primary device and a secondary device. The method includes: the primary device acquiring, via Bluetooth communication, first data packets delivered by a data source device as a first data packet set; the secondary device acquiring, via data interception, second data packets from the data source device as a second data packet set within at least a portion of a time period in a Bluetooth communication process between the primary device and the data source device, the data interception being a working mode that allows unidirectional acquisition of data packets delivered by the data source device in the Bluetooth communication process. Furthermore the secondary device recording details of acquisition of the second data packets in the process of data interception; sending the details of acquisition of the second data packets to the primary device at a predetermined interaction node and the primary device determining a data packet missing in the second data packet set relative to the first data packet set according to the details of acquisition of the data packets and sending the missing data packet from the first data packet set to the secondary device at a predetermined interaction node.

Another embodiment of the present disclosure provides a Bluetooth system. The Bluetooth system includes: a data source device configured to provide data, a primary device configured to establish Bluetooth communication with the data source device, and at least one secondary device; the primary device is configured to acquire, via Bluetooth communication, data packets delivered by a data source device as a first data packet set; the secondary device is configured to acquire, via data interception, data packets from the data source device as a second data packet set within at least a portion of a time period in a Bluetooth communication process between the primary device and the data source device, the data interception is a working mode that allows unidirectional acquisition of data packets delivered by the data source device in the Bluetooth communication process. the primary device and the secondary device have a plurality of predetermined interaction nodes; the secondary device is configured to send the details of acquisition of the data packets in the process of data interception at a predetermined interaction node; and the primary device is configured to determine a data packet missing from the second data packet set relative to the first data packet set according to the details of acquisition of the data packets and send the missing data packet from the first data packet set to the secondary device.

Another embodiment of the present disclosure provides an electronic device. The electronic device includes: a memory, a communication module and a processor coupled to the memory and the communication module; the memory storing instructions that are executable by the processor, the execution of the instructions by the processor causes the processor via the communication module to: acquire, via Bluetooth communication, first data packets delivered by a data source device as a first data packet set, receive details of acquisition of a second data packets from a secondary device at a predetermined interaction node, determine a data packet missed by the secondary device relative to the first data packet set according to the details of acquisition of the second data packets, and send the data packet missed by the secondary device from the first data packet set at a predetermined interaction node.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present application instead of limiting the present application.

In Bluetooth protocols, a Bluetooth device does not need to fulfill all the Bluetooth specifications. For compatibility between different Bluetooth devices, some application layer-specific protocols are defined in the Bluetooth specifications, and these protocols are used to define how to implement a connection or application between the Bluetooth devices.

The Advanced Audio Distribution Profile (A2DP) is a subset in the above described Bluetooth profiles. The A2DP is dedicated to transfer of stereo music via the Bluetooth. In a case where two Bluetooth devices both support the A2DP, the stereo music may be transferred via the Bluetooth.

Figure 1:
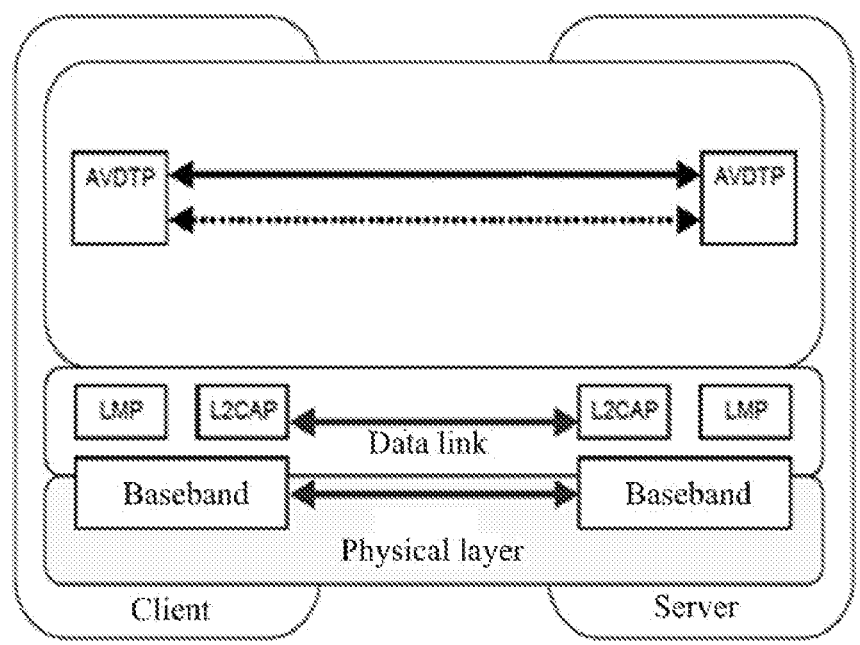
FIG. 1 is a schematic diagram of a protocol stack of the conventional AVDTP protocol.

The Audio/Video Distribution Transport Protocol (AVDTP) is used to depict transmission of audios/videos between Bluetooth devices, and pertains to fundamental protocols of the A2DP protocol. As illustrated in FIG. 1, the AVDTP protocol in the protocol stack is illustrated, which is established on an L2CAP channel.

Figure 2:
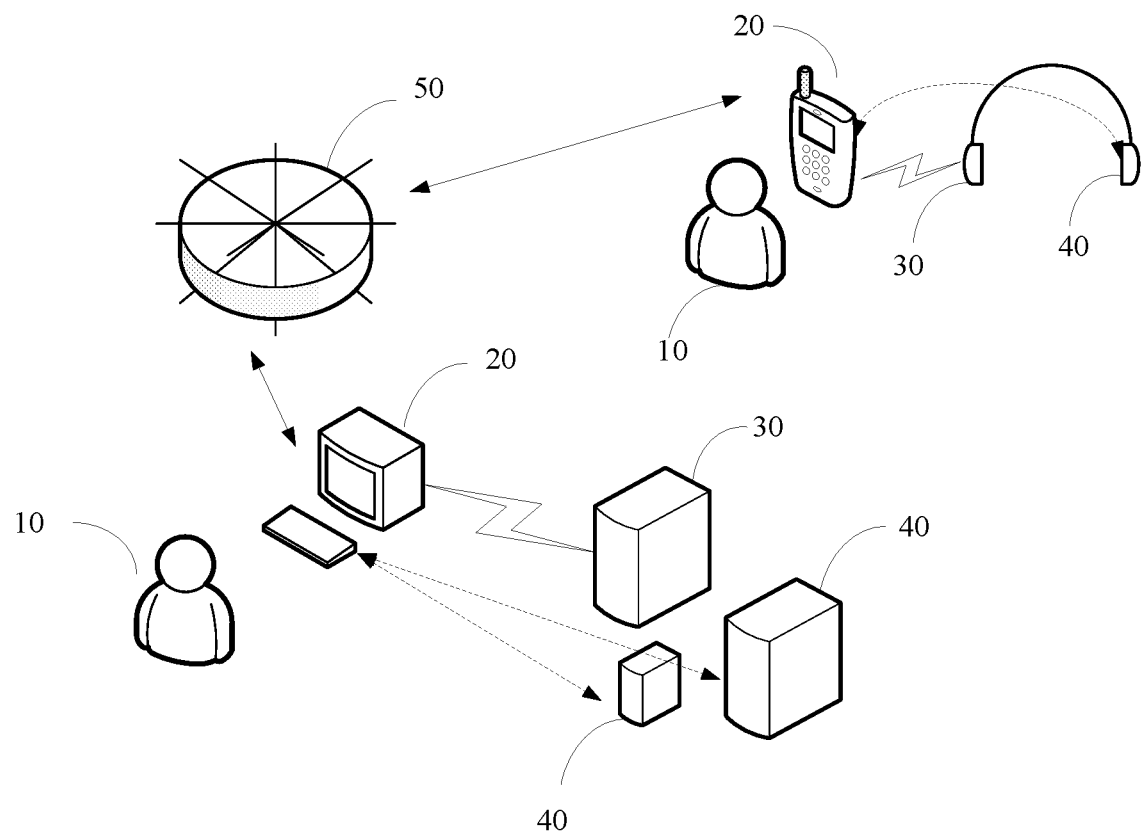
FIG. 2 is a schematic diagram of an application environment according to an embodiment of the present disclosure.

FIG. 2 illustrates an application environment where stereo audios are transferred via the A2DP according to an embodiment of the present disclosure. As illustrated in FIG. 2, the application environment includes: a user 10, a data source output device 20, a multi-channel playback device (including a first audio playback device 30 and a second audio playback device 40), and a network 50.

The user 10 may be a group having the same or similar operation behaviors in any number, for example, a family, a work group or individuals. The user 10 may interact with the data source device 20 and/or the multi-channel playback device by using one or a plurality of user interaction device of any suitable type, for example, a mouse, a keypad, a remote control, a touch screen, a motion sensing camera, or a smart wearable device, input instructions or control the data source device 20 and/or the multi-channel playback device to perform one or a plurality of operations, for example, an audio playback operation.

The data source device 20 may be a suitable electronic device that supports A2DP and provides one or a plurality of audio contents, for example, a smart phone, a tablet computer, an MP3 player, a personal computer, a laptop computer, a personal audio device, a CD player, or any other smart/non-smart terminal device. The data source device 20 is coupled to at least one storage medium configured to store audio data, and acquires audio data. The data source device 20 may also be a combination of one or a plurality of electronic devices, for example, a smart phone and a digital-to-analog converter (DAC) connected thereto.

The multi-channel playback device may include a first audio playback device 30 and a second audio playback device 40. The multi-channel playback device may be a suitable electronic device that supports the A2DP and is capable of playing audio data, for example, a stereo headphone, a 2.1 channel speaker, a 5.1 channel audio device, a stereo speaker or any other suitable speaker group. The first audio playback device 30 and the second audio playback device 40 are merely used to represent speaker parts that play audio data in different channels. For example, with respect to stereo audio data, the first audio playback device 30 may be a left-channel headphone, and the second audio playback device 40 is a right-channel headphone. Nevertheless, the first audio playback device 30 may also be a right-channel headphone, and the second audio playback device 40 may also be a left-channel headphone.

The data source device 20 may establish a Bluetooth connection with the multi-channel audio playback device according to a user instruction, and transfer audio data based on A2DP. In this embodiment, the data source device 20 may establish a Bluetooth connection with the first audio playback device 30, and provide some related information.

The network 50 may be a suitable wired or wireless network that implements communication between two electronic devices, for example, the Internet, a local area network or a cabled network. The data source device 20 has at least one network interface, establishes a communication connection with the network 50, and acquires corresponding audio data or instructions from the network 50. Nevertheless, the data source device 20 may also have at least one local storage device, and acquire corresponding audio data from the local storage device.

In other embodiments, some devices may be added or removed according to the actual needs. For example, the network 50 may be removed or a user interaction device may be added.

The user 10 sends an instruction to the data source device 20 (for example, a smart phone), and the data source device 20 sends, via Bluetooth, audio data to the first audio playback device 30 based on A2DP according to the related instruction.

In the process that the data source device 20 sends the audio data, the second audio playback device 40 is in a working mode of data interception, and intercepts the sent audio data to acquire the audio data.

A communication connection may also be established between the first audio playback device 30 and the second audio playback device 40 within some time segments for data transmission. For example, some information desired by data interception by the second audio playback device 40 may also be transmitted between the first audio playback device 30 and the second audio playback device 40 via Bluetooth communication (for example, the primary device may send frequency modulation information of the data source device to the secondary device via an L2CAP instruction).

FIG. 2 only illustrates two users 10, two data source devices 20, two first audio playback devices 30, and three second audio playback devices 40. However, a person skilled in the art should understand that in practical application, the application environment may include more users 10, more data source devices 20, more first audio playback devices 30 or more second audio playback devices 40. In addition, the application environment according to the embodiment as illustrated in FIG. 2 is described using A2DP-based Bluetooth audio transmission as an example. However, the method for Bluetooth communication according to the embodiment of the present disclosure may also be applied to any suitable scenario where data needs to be transmitted from one data source output device to a plurality of different data receiving devices via Bluetooth transmission, but is not limited to application of stereo audio transmission based on A2DP.

It should be noted that, in the embodiments of the present disclosure, the device which establishes a Bluetooth communication connection with the data source device and acquires data is referred to as "a primary device", and the device which acquires data packets delivered by the data source via data interception is referred to as "a secondary device". The primary device and the secondary device are merely used to represent roles of the device in the Bluetooth communication, but are not specific physical devices. That is, in some possible cases, the roles of the first audio playback device 30 and the second audio playback device 40 may also be exchanged. To be specific, the second audio playback device 40 may be selected as the primary device, and the first audio playback device 30 may be selected as the secondary device.

In the above application scenarios, the data interception performed by the secondary device is a unidirectional communication process. Interaction or communication is not carried out between the secondary device and the data source device. This may reduce the communication bandwidth consumed between the secondary device and the primary device. In addition, integrity of the data packets acquired by the secondary device via data interception may not be ensured.

Figure 3:
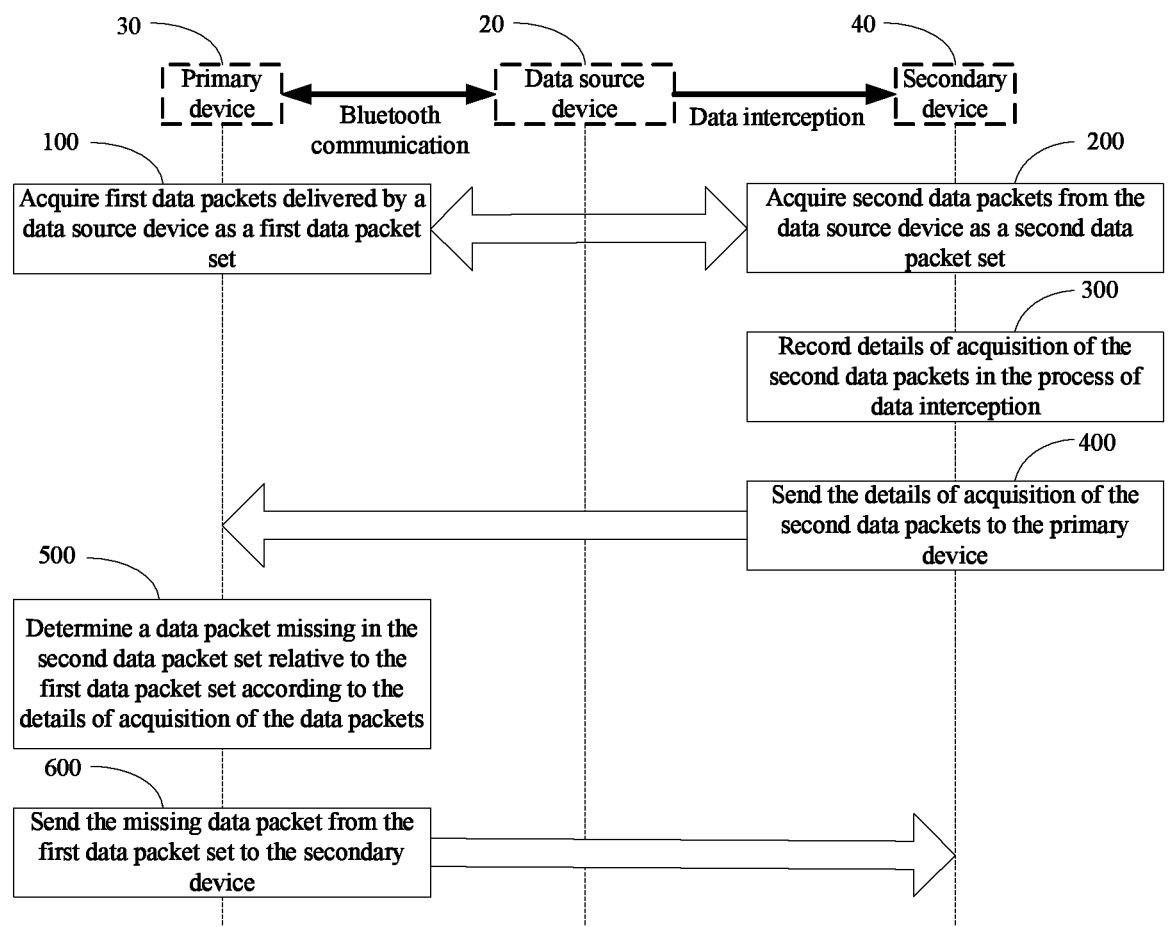
FIG. 3 is a schematic diagram of a method for Bluetooth communication according to an embodiment of the present disclosure.

To further improve integrity of the data packets acquired by the secondary device, FIG. 3 is a schematic flowchart of a method applied to the above application scenario according to an embodiment of the present disclosure.

As illustrated in FIG. 3, the method includes the following steps:

100: A primary device acquires, via Bluetooth communication, first data packets delivered by a data source device as a first data packet set. The Bluetooth communication process is normal point-to-point interactive data transmission course between the data source device 20 and the primary device 30 in Bluetooth communication. Since such interactions as handshakes are present between the primary device and the data source device, the first data packet set can be considered as an integral data packet set. In other words, the data packets delivered by the data source device will all be received or cached by the primary device.

200: The secondary device acquires, via data interception, second data packets from the data source device as a second data packet set within at least a portion of a time period in a Bluetooth communication process between the primary device and the data source device.

The data interception is a working mode that allows unidirectional acquisition of the first data packets delivered by the data source device in the Bluetooth communication process. In the working mode of data interception, the secondary device 40 merely acquires, in a unidirectional manner, the data output by the data source device 20 but fails to feedback the details of data acquisition to the data source device 20.

Under A2DP, although the data source device 20 is only allowed to establish a communication connection with one audio playback device, other audio playback devices that need to receive the same data may access the data source device 20 based on the working mode of data interception to acquire the sent audio data.

In some embodiments, the second audio playback device 40 may enter the working mode of data interception in different time segments in the Bluetooth communication process, instead of being synchronous with the Bluetooth communication process. For example, if the electronic device is a 2.1 channel audio device, the audio playback device for providing the bass part enters the working mode of data interception only upon receiving an instruction of starting the bass part from the user, and acquires the data sent by the data source device.

300: The secondary device records details of acquisition of the second data packets in the process of data interception. Generally, the data may be sent and received piecewise in the form of data packet. The data packet further includes some information marking or indicating the data packet in addition to the payload data. The secondary device can record the information and forms the details of acquisition of the second data packets which indicates reception details.

400: The details of acquisition of the second data packets are sent to the primary device at a predetermined interaction node. The predetermined interaction node refers to a process of data interaction between the primary device and the secondary device, for example, a handshake between the primary device and the secondary device. The interaction node is not constantly present in the entire Bluetooth communication process. Interaction may be carried out between the secondary device and the primary device based on a predetermined time cycle or when the other threshold conditions are satisfied, for example, at an interval of a specific time period or of a specific data sending and receiving amount.

500: A data packet missing in the second data packet set relative to the first data packet set is determined according to the details of acquisition of the second data packets. The manner of data interception by the secondary device may be determined according to the details of acquisition of the data packets, and hence the acquired data packets are received. In this way, the primary device 30 may determine the data packet missed by the secondary device in the process of data interception by comparing the difference between the first data packets (which may be considered as integral) received by the primary device 30 and the second data packet received by the secondary device 40.

600: The missing data packet is sent from the first data packet set to the secondary device at a predetermined interaction node. The primary device and the secondary device both need to ensure integrity of the received data packets, and hence implement smooth playback of the audio signals. Therefore, the primary device 30 can send the missing data packet to the secondary device during the communication between the primary device and the secondary device, such that consistency of the data packets received by the secondary device and the primary device is ensured.

By means of the above data interception, a plurality of audio playback devices may also acquire the data sent by the data source device 20 and play the audio data, with no need of an additional data forwarding process. In this way, data load in the case of stereo audio or other cases where multi-channel data transmission is desired may be better reduced, and thus the bandwidth occupied for data forwarding is reduced.

In addition, by means of interaction between the primary device and the secondary device, consistency of the data between the primary device and the secondary device is ensured. In this way, data non-integrity caused by handshakes, Bluetooth baseband processing or retransmission mechanisms lacking between the secondary device and the data source device is prevented.

Figure 6:
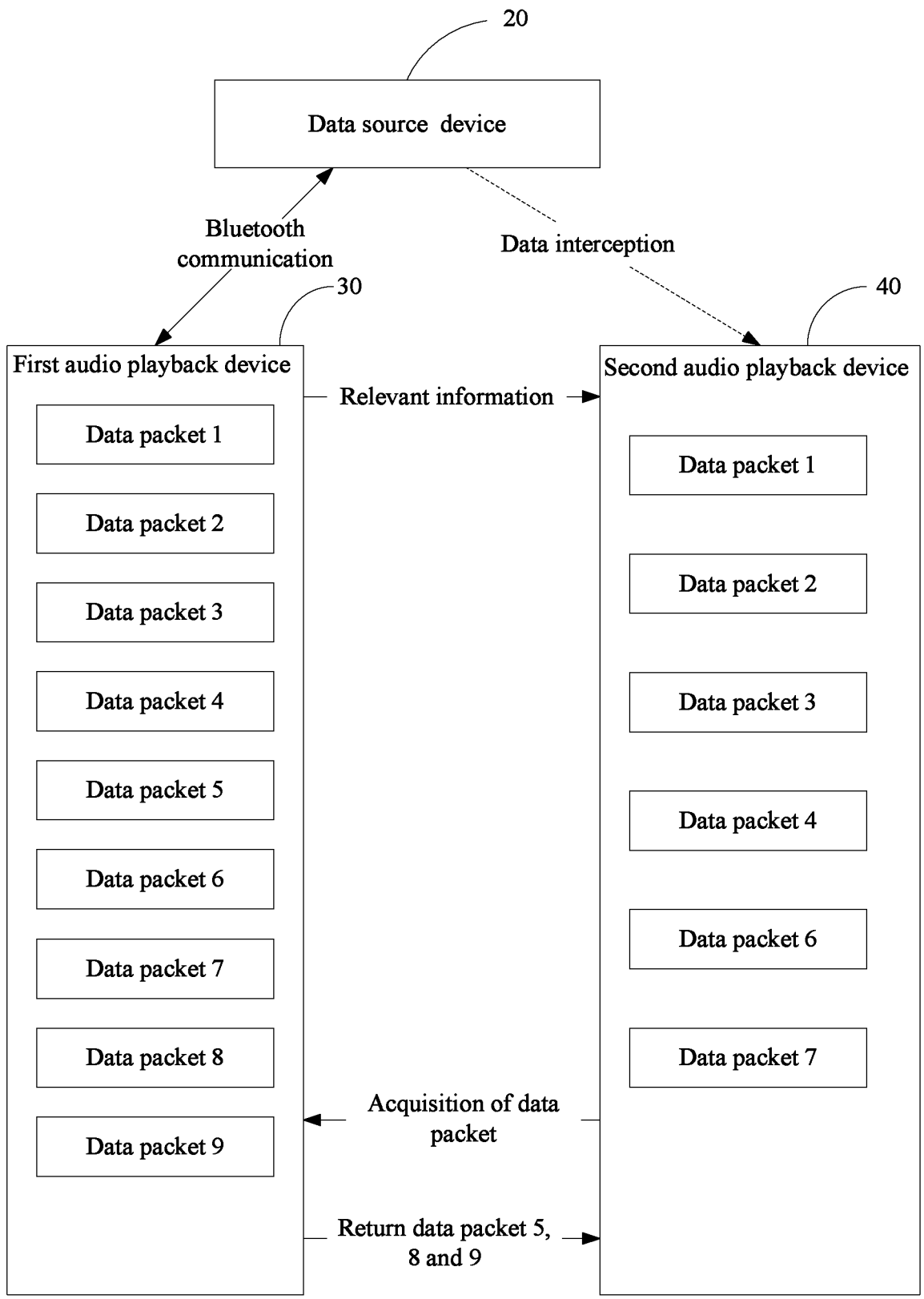
FIG. 6 is a schematic diagram of a system for Bluetooth communication according to an embodiment of the present disclosure.

The verification of the missing data packet is completed by the primary device, which, compared with the manner of verification by the secondary device, most quickly determines the data packets of the secondary device (the currently missing data packet is determined), and directly sends the data packets to the secondary device. In this way, the interaction between the secondary device and the primary device is more efficient. For example, when the secondary device misses the data packets 8 and 9 (as shown in FIG. 6), the secondary device needs to determine the missing data packet upon receiving the data packet 10. During judgment by using the primary device, it may be immediately determined that the data packets 8 and 9 are missed by comparing the difference between the first data packet set and the second data packet set.

Figure 4:
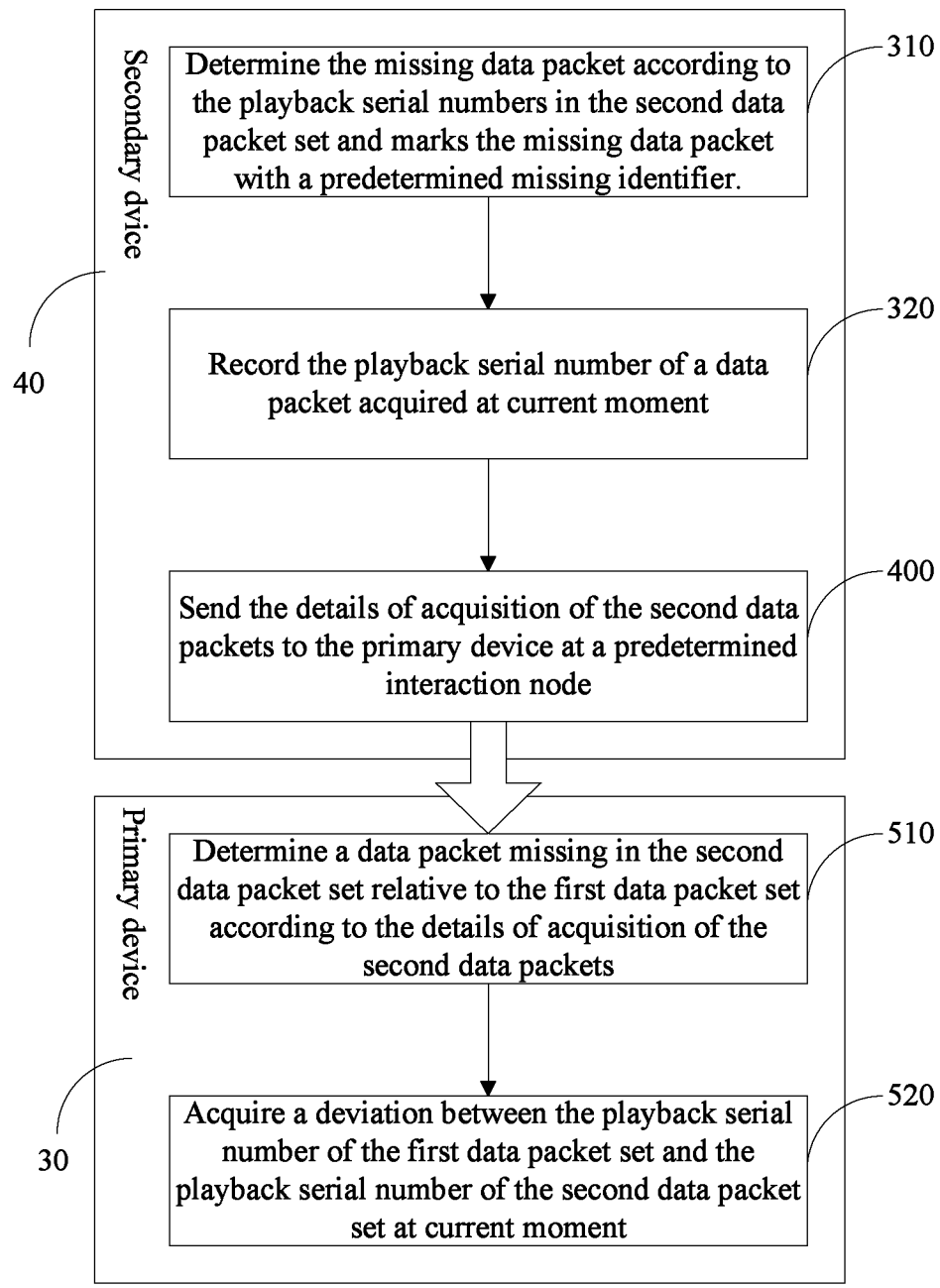
FIG. 4 is a schematic diagram of a method for determining a missing data packet according to an embodiment of the present disclosure.

FIG. 4 is a flowchart of a method for determining the missing data packet according to an embodiment of the present disclosure. As illustrated in FIG. 4, the method includes the following steps:

310: The secondary device determines the missing data packet according to the playback serial numbers in the second data packet set and marks the missing data packet with a predetermined missing identifier.

In the embodiment of the present disclosure, the first data packet delivered by the data source device has a playback serial number corresponding to a sending sequence. The playback serial numbers include a series of contiguous numbers, which are used to identify different data packets and the time sequence of the data packets. For example, in the AVDTP protocol, the audio data may be sequentially sent according to the serial numbers from 0x0000 to 0xffff.

Therefore, the secondary device can determine whether a data packet is missing according to whether the serial numbers of the received data packets are contiguous. That is, if the playback serial numbers of the adjacent received data packets are not contiguous, it can be determined a data packet is missing between the two data packets. The missing data packet is the difference between two non-contiguous playback serial numbers.

The secondary device may identify the missing data packets to differentiate the data packet received from the data packet not received yet. For example, the data packet received may be represented by "1", and the data packet not received yet may be represented by "0". As seen from the above description, the secondary device may only determine whether a data packet is missing according to whether the playback serial numbers are contiguous. If a missing data packet is at the tail of the playback serial number (that is, the latest data packet), the judgment may not be performed.

320: The playback serial number of the second data packet acquired at current moment is recorded. The secondary device needs to further record in real time the playback serial number of the latest acquired data packet via data interception. The playback serial number of the data packet may be used to assist the primary device to determine all the missing data packets of the secondary device.

400: The details of acquisition of the second data packets are sent to the primary device at a predetermined interaction node. In this embodiment, the secondary device may specifically packetize the information indicative of the details of acquisition of the data packets as a payload, and send the payload to the primary device via a bottom-layer LMP instruction.

510: The primary device compares the details of acquisition of the second data packets with the first data packet set to determine the data packet with a missing identifier. Upon receiving the information from the secondary device, the primary device may decode the received information to determine the data packet with the missing identifier in the payload. For example, the number of data packets with the identifier "0" and the corresponding playback serial numbers may be determined.

520: The primary device acquires a deviation between the playback serial number of the first data packet set and the playback serial number of the second data packet set at current moment. The deviation playback serial number refers to the data packet between the playback serial number of the latest second data packet acquired by the secondary device from the payload and the playback serial number of the latest first data packet acquired by the primary device. It may be understood that when a part of the data packets are missed by the secondary device, deviation of the playback serial number may be caused. For example, as illustrated in FIG. 6, after the secondary device 40 receives the first data packets 9 in the process of data interception and misses the data packets 10 to 12, the primary device 30 is capable of quickly determining that the data packets 10 and 11 are missing in the process of data interception according to the difference of the playback serial numbers (that is, the data packets 10 and 11 are not present between the data packet 9 and the data packet 12).

600: The missing data packet which is from the first data packet set is sent to the secondary device at the predetermined interaction node. After the data packets missed by the secondary device are determined, the primary device may send the missing data packets to the secondary device via the AVDTP protocol, such that it is ensured that the secondary device is capable of acquiring integral audio data.

Nevertheless, when the communication state between the secondary device and the data source device is good and no packet loss is present in the process of data interception, the primary device may also determine that the data acquired by the secondary device is integral according to the details of acquisition of the data packets. Therefore, no data packet is sent to the secondary device, and the interaction is terminated.

Figure 5:
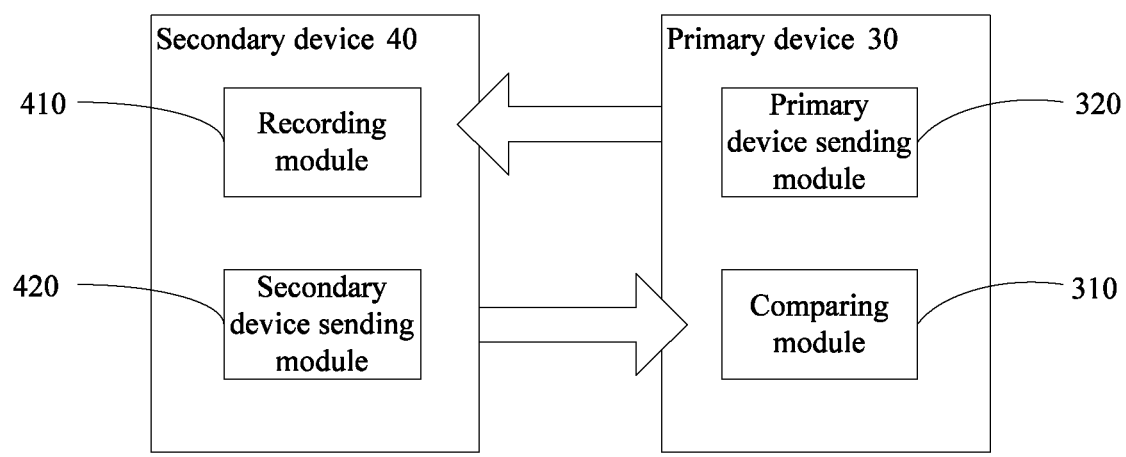
FIG. 5 is a schematic diagram of an apparatus for Bluetooth communication according to an embodiment of the present disclosure.

FIG. 5 is a schematic block diagram of an apparatus for Bluetooth communication applied in a primary device and a secondary device according to an embodiment of the present disclosure. As illustrated in FIG. 5, the primary device 30 is configured to acquire, via Bluetooth communication, data packets delivered by a data source device as a first data packet set.

The secondary device 40 is configured to acquire, via data interception, data packets from the data source device as a second data packet set within at least a portion of a time period in a Bluetooth communication process between the primary device and the data source device, wherein the data interception is a working mode that allows unidirectional acquisition of data packets delivered by the data source device in the Bluetooth communication process.

The secondary device 40 includes: a recording module 410, configured to record details of acquisition of the data packet in the process of data interception; and a secondary device sending module 420, configured to send the details of acquisition of the data packets to the primary device at a predetermined interaction node.

The primary device 30 includes: a comparing module 310, configured to determine a data packet missing in the second data packet set relative to the first data packet set according to the details of acquisition of the data packets; and a primary device sending module 320, configured to send the missing data packet from the first data packet set to the secondary device at a predetermined interaction node.

In practical operations, the secondary device 40 records the details of acquisition of the data packets in the process of data interception by using the recording module 410, and then sends the details of acquisition of the data packets to the primary device by using the secondary device sending module 420 at a predetermined interaction node. The primary device 30 determines a data packet missing in the second data packet set relative to the first data packet set by using the comparing module 310 according to the details of acquisition of the data packets. After the missing data packet is determined, the primary device sending module 320 sends the missing data packet from the first data packet set to the secondary device at a predetermined interaction node, such that data interaction is completed between the primary device and the secondary device.

In some embodiments of the present disclosure, the data packet delivered by the data source device has a playback serial number corresponding to a sending sequence. The apparatus for Bluetooth communication may be based on the playback serial number, and hence the primary device determines the missing data packet.

Specifically, the recording module 410 may be configured to determine the missing data packet and mark the missing data packet with a predetermined missing identifier according to the playback serial numbers in the second data packet set; and record the playback serial number of a data packet acquired at the current moment. Correspondingly, the comparing module 310 may be specifically configured to compare the details of acquisition of the data packets with the first data packet set to determine the data packet with a missing identifier and an offset playback serial number between the first data packet set and the second data packet set at the current moment.

It should be noted that since the apparatus embodiments and the method embodiments are based on the same inventive concept, and technical contents in the method embodiments may also be applied to the apparatus embodiments, which are thus not described herein any further.

Embodiments of the present disclosure further provide a Bluetooth system, which may be applied to the application scenario as illustrated in FIG. 1. The Bluetooth system includes: a data source output device 20, a first audio playback device 30 as a primary device, and a second audio playback device 40 as a secondary device.

As illustrated in FIG. 6, in an interaction cycle between the first audio playback device 30 and the second audio playback device 40, the data source device 20 establishes a Bluetooth connection with the first audio playback device 30, and delivers data packets with serial numbers of 1 to 9. The second audio playback device 40 acquires information related to the data interception via the first audio playback device 30 to enter a working mode of data interception and acquire data packets sent by the data source device 20.

In the process of data interception, the second audio playback device 40 causes the data packets 5, 8 and 9 to be lost due to various factors. As such, the data packet 5 is not present between the data packet 4 and the data packet 6, and thus the secondary device can determine that the data packet 5 is the missing data packet and mark the data packet 5 with a missing identifier. In addition, the latest data packet need to be recorded the playback serial number of 7 at current moment. When a connection is established between the first audio playback device 30 and the second audio playback device 40 and interaction is carried out therebetween, the above information is packetized and then sent to the first audio playback device 30.

Upon receiving the above information, the first audio playback device 30 may determine that the missing data packet in the secondary device is the data packet 5 (according to the missing identifier), and that the data packets 8 and 9 are also missed by the secondary device (according to an offset of the playback serial number between the first audio playback device 30 and the second audio playback device 40).

Finally, during the interaction between the first audio playback device 30 and the second audio playback device 40, the missing data packets are sent to the second audio playback device 40, such that integrity of the received data is ensured.

The second audio playback device 40 performs the above recording operation in the entire process of data interception. The interaction between the first audio playback device 30 and the second audio playback device 40 (sending the details of acquisition of the data packets and returning the missing data packets) may be carried out in the process of data interception for multiple times at a specific frequency.

Embodiments of the present disclosure further provide an electronic device. The electronic device may either have the function modules included in the primary device, or have the function modules of the secondary device, and may have all the function modules in both the primary device and the secondary device, such that the electronic device is used as the corresponding primary device or secondary device.

Figure 7:
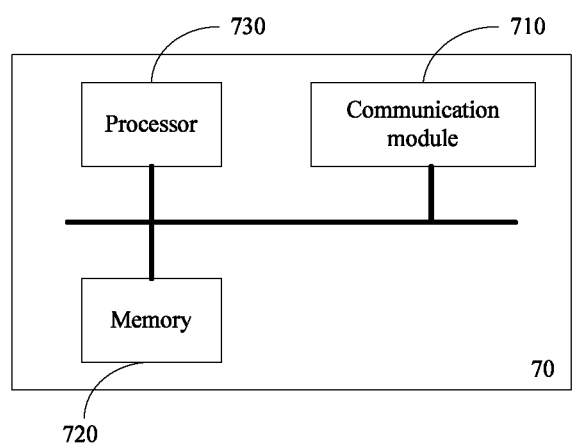
FIG. 7 is a structural block diagram of an electronic device according to an embodiment of the present disclosure.

As illustrated in FIG. 7, the electronic device 70 includes a communication module 710, a memory 720 and a processor 730 coupled to the communication module 710 and the memory 720.

The memory 720, as a non-volatile computer-readable storage medium, may be configured to store non-volatile software programs, non-volatile computer-executable programs and modules, for example, the recording module 410, the secondary device sending module 420, the comparing module 310 and the primary device sending module 320 illustrated in FIG. 4 of the specification.

When the electronic device 70 serves the role of a primary device, the memory 720 stores an instruction program that is executable by the processor 710, and the processor 710 executes the instruction program to cause the processor 730 via the communication module 710 to: acquire, via Bluetooth communication, data packets delivered by a data source device as a first data packet set, receive details of acquisition of the data packets from a secondary device at a predetermined interaction node, determine a data packet missed by the secondary device relative to the first data packet set according to the details of acquisition of the data packets, and send the data packet missed by the secondary device from the first data packet set at a predetermined interaction node.

When the electronic device 70 serves the role of a secondary device, the memory 720 stores an instruction program that is executable by the processor 730, and the processor 710 executes the instruction program to cause the processor 710 via the communication module 710 to: acquire data packets from a data source device as a second data packet set by means of data interception within at least a portion of a time period in a Bluetooth communication process, wherein the data interception is a working mode that allows unidirectional acquisition of data packets delivered by the data source device in the Bluetooth communication process, record details of acquisition of the data packets in the process of data interception, and send the details of acquisition of the data packet and receive data packet from a primary device at a predetermined interaction node.

Professional personnel should be further aware that with reference to the embodiments of the present application disclosed herein, various exemplary Bluetooth communication steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system.

Professional technical personnel may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for Bluetooth communication, performing by a primary device and a secondary device in Bluetooth communication, comprising:
    acquiring, by the primary device, first data packets delivered by a data source device as a first data packet set via Bluetooth communication;
    acquiring, by the secondary device, second data packets from the data source device as a second data packet set via data interception within at least a portion of a time period in a Bluetooth communication process between the primary device and the data source device; the first and second data packets having playback serial numbers corresponding to a sending sequence of the data source device, the playback serial numbers in the first data packet set comprising a series of contiguous numbers, which are used to identify different data packets and the time sequence of the data packets; the data interception being a working mode that allows unidirectional acquisition of the second data packets delivered by the data source device in the Bluetooth communication process;
    recording details of acquisition of the second data packets in the process of data interception according to the playback serial numbers in the second data packet set by the secondary device, the details of acquisition of the second data packets comprising a missing data packet with a predetermined missing identifier and the playback serial number of a second data packet acquired at current moment;
    sending the details of acquisition of the second data packets to the primary device at a predetermined interaction node;
    determining, by the primary device, the data packet missing in the second data packet set relative to the first data packet set according to the details of acquisition of the second data packets; and
    sending the missing data packet from the first data packet set to the secondary device at a predetermined interaction node.

2. The method according to claim 1, wherein the recording details of acquisition of the second data packets in the process of data interception according to the playback serial numbers in the second data packet set comprises:
    determining the missing data packet according to the playback serial numbers in the second data packet set;
    marking the missing data packet with the predetermined missing identifier; and
    recording the playback serial number of the second data packet acquired at current moment.

3. The method according to claim 2, wherein the determining the data packet missing in the second data packet set relative to the first data packet set according to the details of acquisition of the second data packets comprises:
    comparing the details of acquisition of the second data packets with the first data packet set to determine the data packet with a missing identifier and;
    acquiring a deviation between the playback serial number in the first data packet set and the playback serial number in the second data packet set at current moment.

4. An electronic device, comprising:
    a memory, a communication module and a processor coupled to the memory and the communication module;
    the memory storing instructions that are executable by the processor, wherein execution of the instructions by the processor causes the processor via the communication module to:
    acquire, via Bluetooth communication, first data packets delivered by a data source device as a first data packet set,
    receive details of acquisition of second data packets from a secondary device at a predetermined interaction node; the first and second data packets having playback serial numbers corresponding to a sending sequence of the data source device, the playback serial numbers in the first data packet set comprising a series of contiguous numbers, which are used to identify different data packets and the time sequence of the data packets, the details of acquisition of the second data packets being recorded according to the playback serial numbers of the second data packets, and comprising a missing data packet with a predetermined missing identifier and the playback serial number of a second data packet acquired at current moment;
    determine the data packet missed by the secondary device relative to the first data packet set according to the details of acquisition of the second data packets; and
    send the data packet missed by the secondary device from the first data packet set at a predetermined interaction node.

5. The electronic device according to claim 4, wherein execution of the instructions by the processor further causes the processor via the communication module to:
    compare the details of acquisition of the second data packets with the first data packet set to determine the data packet with a missing identifier and;
    acquire a deviation between the playback serial number in the first data packet set and the playback serial number of one of the second data packets at current moment.

6. A Bluetooth system, comprising a data source device configured to provide data, a primary device configured to establish Bluetooth communication with the data source device, and at least one secondary device;
- the primary device comprising a first memory, a first communication module and a first processor coupled to the first memory and the first communication module;
- the first memory storing instructions that are executable by the first processor, wherein execution of the instructions by the first processor causes the first processor via the first communication module to:
- acquire, via Bluetooth communication, first data packets delivered by a data source device as a first data packet set;
- receive details of acquisition of a second data packets from a secondary device at a predetermined interaction node; the first and second data packets having playback serial numbers corresponding to a sending sequence of the data source device, the playback serial numbers in the first data packet set comprising a series of contiguous numbers, which are used to identify different data packets and the time sequence of the data packets, the details of acquisition of the second data packets comprising a missing data packet with a predetermined missing identifier and the playback serial number of a second data packet acquired at current moment;
- determine the data packet missed by the secondary device relative to the first data packet set according to the details of acquisition of the second data packets; and
- send the data packet missed by the secondary device from the first data packet set at a predetermined interaction node;
- the secondary device comprising a second memory, a second communication module and a second processor coupled to the second memory and the second communication module;
- the second memory storing instructions that are executable by the second processor, wherein execution of the instructions by the second processor causes the second processor via the second communication module to:
- acquire, via data interception, the second data packets from the data source device as a second data packet set within at least a portion of a time period in a Bluetooth communication process between the primary device and the data source device; the data interception being a working mode that allows unidirectional acquisition of second data packets delivered by the data source device in the Bluetooth communication process;
- record the details of acquisition of the second data packets in the process of data interception according to the playback serial numbers in the second data packet set; and
- send the details of acquisition of the second data packets to the primary device at a predetermined interaction node.

7. The Bluetooth system according to claim 6, wherein execution of the instructions by the second processor further causes the second processor via the second communication module to:
- determine the missing data packet according to the playback serial numbers in the second data packet set;
- mark the missing data packet with the predetermined missing identifier; and
- record the playback serial number of the second data packet acquired at current moment.

8. The Bluetooth system according to claim 7, wherein execution of the instructions by the first processor further causes the first processor via the first communication module to:
- compare the details of acquisition of the second data packets with the first data packet set to determine the data packet with a missing identifier and;
- acquire a deviation between the playback serial number in the first data packet set and the playback serial number in the second data packet set at current moment.

* * * * *